United States Patent
Toth

(10) Patent No.: US 6,584,117 B1
(45) Date of Patent: Jun. 24, 2003

(54) DEACTIVATION OF EXTENDED BASIC RATE ISDN LINK

(75) Inventor: Robert J. Toth, Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/439,207

(22) Filed: Nov. 12, 1999

(51) Int. Cl.$^7$ ................................................ H04J 3/16
(52) U.S. Cl. ................................. 370/465; 379/93.06
(58) Field of Search ........................... 370/401, 402, 370/404, 426, 465, 466, 467; 379/93.01, 93.09, 93.08, 92.03, 100.12, 112.08, 93.05, 93.06

(56) References Cited

U.S. PATENT DOCUMENTS

| | | | |
|---|---|---|---|
| 5,260,970 A | 11/1993 | Henry et al. | 375/10 |
| 5,852,630 A | 12/1998 | Langberg et al. | 375/219 |
| 5,896,390 A | * 4/1999 | Williams | 370/466 |
| 5,943,404 A | * 8/1999 | Sansom et al. | 379/93.06 |

* cited by examiner

Primary Examiner—Wellington Chin
Assistant Examiner—Brenda Pham
(74) Attorney, Agent, or Firm—Allen, Dyer, Doppelt, Milbrath & Gilchrist, P.A.

(57) ABSTRACT

An embedded operations channel (EOC)-based signalling mechanism is incorporated within transceiver interface (U-BR1TE) components of an integrated services digital network (ISDN) telecommunication system, for effecting a relatively fast, warm start reactivation of a previously deactivated extended ISDN link between an ISDN switch and customer premises equipment. In response to the EOC-embedded 'wake-up the loop' message, the receiving U-BR1TE card supplies a 10 Khz wake-up tone to its associated termination equipment (either to the NT-1 in the case of a switch-sourced reactivation, or to the ISDN switch in the case of an NT-1 sourced wake-up request), to reestablish the ISDN loop.

13 Claims, 2 Drawing Sheets

DEACTIVATION OF EXTENDED BASIC RATE ISDN LINK

FIELD OF THE INVENTION

The present invention relates in general to communication systems, and is particularly directed to a new and improved embedded operations channel (EOC)-based signalling mechanism, that is incorporatable within transceiver interface (U-BR1TE) components of an integrated services digital network (ISDN) telecommunication system, for effecting a relatively fast, warm start reactivation of a deactivated extended ISDN link between an ISDN switch and customer premises equipment.

BACKGROUND OF THE INVENTION

Integrated services digital network (ISDN) communication systems enable telecommunication service providers to supply multiple types of signalling channels from a central office over a signal local loop twisted pair to a network termination interface at a customer premises site. ISDN signalling channels, for example, typically include digital data and/or digitized voice (bearer B1/B2) channels, as well as a separate administrative (D) channel that conveys call control information. FIG. 1 shows a reduced complexity example of a non-extended distance ISDN communication system, in which ISDN communications are provided over a local (two-wire metallic) loop 13 directly connecting a central office site (CO) 10 to a customer premises site 20. FIG. 2 diagrammatically illustrates a typical extended distance ISDN communication system, wherein ISDN connectivity between the CO site 10 and a remotely located customer premises site 20 is provided over an extended (PCM) communication link (such as a fiber optic link) 30.

In each of these two ISDN networks, the central office site 10 includes a central office switch 11 (such as a 5ESS switch manufactured by AT&T), which contains a plurality of ISDN transceiver circuits (ISDN U-interface circuits), one of which is shown at 12. For the non-extended distance ISDN system of FIG. 1, the ISDN U-interface circuit 12 terminates one end of a local loop (twisted tip/ring pair) 13, a second end of which ported to a network termination interface (NT-1) circuit 21 serving customer premises equipment, such as ISDN data terminal equipment (DTE) 22.

In the extended distance system of FIG. 2, a U-interface circuit 12 of the central office site 10, located at a 'west' end of extended (PCM) communication link 30, is coupled over the local loop 13 to what is termed in the telephone industry as a U Basic Rate-One Transmission Extension (U-BR1TE) transceiver card 14 (also referred to as a Basic Rate Interface Transmission Extension (U-BRITE) card).

A respective U-BR1TE (or U-BRITE) card contains an ISDN U-interface circuit and an associated PCM bus interface which are operative to transmit and receive standard 2B+D ISDN data traffic over a PCM digital data link, such as a T1=1.544 MB/s link, and to interface the ISDN signals via the local loop to and from loop termination equipment. Namely, the U-BR1TE card 14 at the 'west' end of the link 30 interfaces the local loop 13 with a digital data link 30 for PCM signalling transport to another U-BR1TE transceiver card 24 at an 'east' end of the link 30, serving the customer premises equipment (CPE) site 20. The 'east' U-BR1TE transceiver card 24 is coupled, in turn, over a local loop (twisted two-wire tip/ring pair) 23 to the network termination interface (NT-1) circuit 21, to which customer premises ISDN data terminal equipment 22 is coupled.

A typical ISDN U-interface circuit is capable of operating in what is commonly referred to as a 'warm' start mode, which allows the loop to be deactivated and then, relatively quickly reactivated at a later time, by using an abbreviated training sequence that customarily requires up to 300 msec, rather than up to as many as fifteen seconds in what is commonly referred to as 'cold start' mode. Only the ISDN switch can command deactivation of the link, while either the ISDN switch or the customer premises NT-1 can initiate reactivation of a previously deactivated loop (by the transmission of a 10 kHz wake-up tone).

In order to initiate a warm start deactivation sequence, the ISDN switch 11 sets a specific 'downstream only' maintenance bit in an overhead channel to the NT-1 circuit 21. While this procedure is straightforward forward in the non-extended network of FIG. 1, it becomes a problem in the extended network of FIG. 2, as there is no defined scheme to signal reactivation across an extended interface between the ISDN switch and the NT-1. To address this problem, Bellcore publication TR-NWT-000397 proposes waking up, or reactivating, an extended link by toggling the state of the ACT bit within the M4 out-of-band maintenance channel alternately between opposite logic levels.

In particular, the ACT bit is transmitted low for three sequential superframes, high for the next three superframes, and then low for the next three superframes. Upon detecting this ACT bit toggling sequence, the U-BR1TE card 24 at the receiving end of the extended link supplies the 10 Khz wake-up tone over the local loop 23 to the NT-1. A problem with this approach is the significant delay involved (nine superframes×twelve msec per superframe=108 msec of additional delay in bringing up both loops), which may cause layer two and layer three signaling errors.

SUMMARY OF THE INVENTION

In accordance with the present invention, this multiple superframe-based delay problem in reactivating an extended ISDN link is successfully addressed by means of a communication control software mechanism, which utilizes the embedded operations channel (EOC) to convey a relatively fast 'wake-up the loop' message (that consumes only six msec of delay) between U-BR1TE circuits terminating the extended distance loop. In response to such a 'wake-up the loop' message, the receiving U-BR1TE card proceeds to provide a 10 Khz wake-up tone to its associated termination equipment (either to the NT-1 in the case of a switch-sourced reactivation, or to the ISDN switch in the case of an NT-1 sourced wake-up request), thereby waking up the loop.

DETAILED DESCRIPTION

Figure 1:
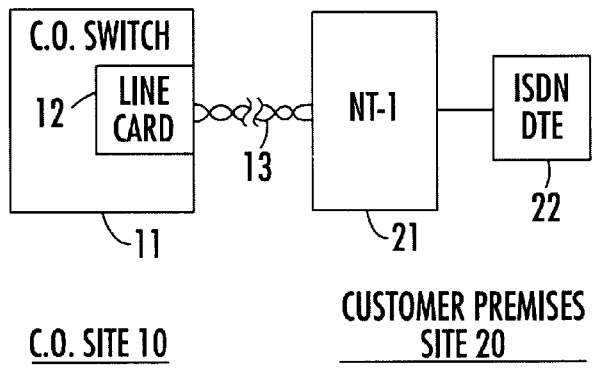
FIG. 1 shows a reduced complexity example of a non-extended distance ISDN communication network.

Before describing in detail the embedded operations channel (EOC)-based extended ISDN link reactivation mechanism in accordance with the present invention, it should be observed that the invention resides primarily in an augmentation of the communication control software that is executable within the control processor of a U-BR1TE circuit card, through which ISDN communications are conducted over an extended (PCM) communications link between relatively remote sites serving a central office ISDN switch and customer premises equipment. Consequently, in order to avoid obscuring the present disclosure with details, which will be readily apparent to those skilled in the art having benefit of the description herein, ISDN system configuration and operation, as well as the functionality of the communication control software of a non-limiting implementation of the invention have, for the most part, been illustrated in the drawings by readily understandable block diagrams and an associated flow chart, which show only those specific details that are pertinent to an understanding of the invention.

Figure 2:
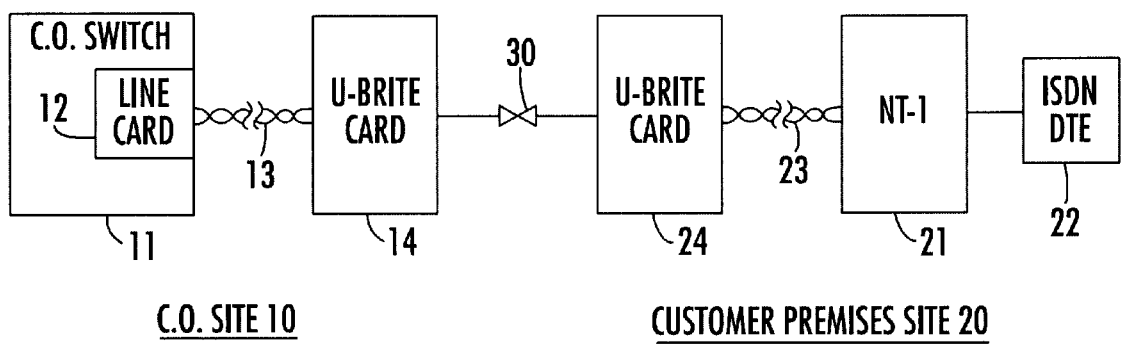
FIG. 2 diagrammatically illustrates a reduced complexity example of an extended distance ISDN communication network.
Figure 3:
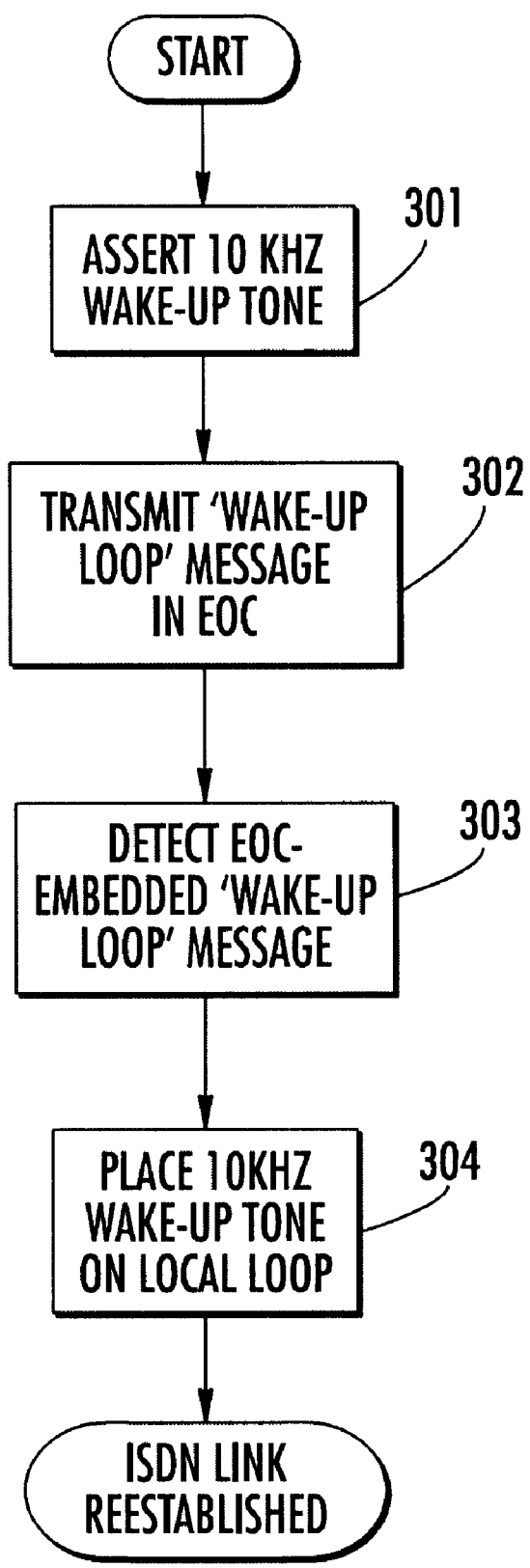
FIG. 3 is a flow chart showing the steps of an embedded operations channel (EOC)-based signalling mechanism of the present invention, for reactivating a previously deactivated extended distance ISDN link.

The present invention may be readily understood by reference to the flow chart of FIG. 3, which shows the respective steps carried out by the U-BR1TE circuits of the extended ISDN communication system of FIG. 2, that uses the embedded operations channel (EOC) to transmit a 'wake-up the loop' message for reactivating a previously deactivated extended ISDN link, to which the U-BR1TE circuits are coupled. For purposes of providing a non-limiting example, the signaling flow direction from 'east' to 'west' in the extended distance network diagram of FIG. 2, wherein loop reactivation is initiated by an NT-1 desiring to place a call, will be used. As the same message transmission sequence applies in the 'west' to 'east' direction, initiated by the ISDN switch, it will not be individually described.

As shown at step 301, to initiate fast warm-up reactivation of the extended ISDN loop (previously deactivated by the ISDN switch 11, as described above) from the 'east' end of the link, the customer premises NT-1 24 asserts a 10 kHz wake-up tone onto the local loop 23 to the is U-BR1TE circuit card 24. In response to detecting the 10 kHz tone from the local loop 23 at step 302, the communications control processor within the U-BR1TE card 24 accesses a prescribed 'wake-up the loop' message from memory, and inserts this message into the embedded operations channel (EOC), that is used to convey overhead signalling messages over the extended ISDN link to the 'west' end of the link.

At step 303, the communications control processor within the U-BR1TE card 14 terminating the 'west' end of the PCM link 30 decodes the contents of the EOC message. Upon detecting the 'wake-up the loop' code sequence within the EOC message, at step 304, the U-BR1TE card 14 asserts a 10 kHz wake-up tone onto the local loop 13 to the U-interface circuit card 12 in the CO switch 11 terminating the local loop 13, thereby reactivating the link. (As noted above, reactivating the link from the ISDN switch involves the use of the same message transmission sequence of FIG. 3, except for reversal of direction of the signal flow.)

Advantageously, the present invention's use of the embedded operations channel (EOC) to convey the 'wake-up the loop' message consumes only six msec of delay; this provides an order of magnitude in wake-up speed improvement, compared to the 108 msec of delay involved in the use of nine superframes to convey toggled ACT bits, described above. It thereby significantly reduces the likelihood of layer two and layer three signaling errors—potential problem in the above-referenced Bellcore multiple superframe approach.

While I have shown and described an embodiment in accordance with the present invention, it is to be understood that the same is not limited thereto, but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. For use with a digital telecommunication network having a first digital communication signal transceiver, through which digital communication signals conveyed over an extended distance communications link are interfaced with a local loop, to which a digital communications switch is coupled, and a second digital communication signal transceiver, through which said digital communication signals conveyed over said extended distance communications link are interfaced with a remote loop, to which a customer premises interface serving digital communications equipment at a customer premises site is coupled, a method of reactivating a communications path between said digital communications switch and said digital communications equipment at said customer premises site comprising the steps of:

(a) causing one of said first and second digital communication signal transceivers to transmit a prescribed communications path reactivation message within an out-of-band communication channel of said extended distance communications link; and (b) in response to another of first and second digital communication signal transceivers receiving said prescribed communications path reactivation message within said out-of-band communication channel of said extended distance communications link, reactivating said communications path between said digital communications switch and said digital communications equipment at said customer premises site.

2. A method according to claim 1, wherein step (b) comprises causing said another of first and second digital communication signal transceivers receiving said prescribed communications path reactivation message to transmit a signal, different from said prescribed communications path reactivation message, over its associated (local/remote) loop, that is effective to reactivate digital communications circuitry terminating said associated (local/remote) loop.

3. A method according to claim 1, wherein step (b) comprises causing said another of first and second digital communication signal transceivers receiving said prescribed communications path reactivation message to transmit a prescribed monotone signal, that is effective to reactivate digital communications circuitry terminating said associated (local/remote) loop.

4. A method according to claim 3, wherein said prescribed monotone signal is a 10 kHz tone signal.

5. A method according to claim 1, wherein each of said first and second digital communication signal transceivers comprises a U Basic Rate-One Transmission Extension (U-BR1TE) integrated services digital network (ISDN) transceiver, and wherein said out-of-band communication channel comprises an embedded operations channel.

6. A method according to claim 5, wherein step (b) comprises causing said another of first and second digital communication signal transceivers receiving said prescribed communications path reactivation message to transmit a prescribed monotone signal, that is effective to reactivate digital communications circuitry terminating said associated (local/remote) loop.

7. A method according to claim 6, wherein said prescribed monotone signal is a 10 kHz tone signal.

8. For use with an integrated services digital network (ISDN) telecommunication system having a first U Basic Rate-One Transmission Extension (U-BR1TE) transceiver, through which ISDN communication signals conveyed over an extended distance digital communications link are interfaced with a local metallic two-wire path, to which an ISDN switch is coupled, and a second U-BR1TE transceiver, through which said ISDN communication signals conveyed over said extended distance digital communications link are interfaced with a remote metallic two-wire path, to which a customer premises interface serving digital communications equipment at a customer premises site is coupled, a method of reactivating previously deactivated ISDN connectivity between said ISDN switch and said digital communications equipment at said customer premises site comprising the steps of:

(a) causing one of said first and second U-BR1TE transceivers to transmit an ISDN connectivity reactivation message within an extended operations channel (EOC) transported by said extended distance communications link; and (b) in response to another of first and second U-BR1TE transceivers receiving said ISDN connectivity reactivation message within said EOC channel, reestablishing ISDN connectivity between said ISDN switch and said digital communications equipment at said customer premises site.

9. A method according to claim 8, wherein step (b) comprises causing said another U-BR1TE transceiver receiving said ISDN connectivity reactivation message to transmit a 10 kHz wake-up tone, that is effective to reactivate digital communications circuitry terminating said another U-BR1TE's associated (local/remote) loop.

10. A method according to claim 9, wherein step (a) comprises transmitting a 10 kHz tone to said one U-BR1TE transceiver, and thereby causing said one U-BR1TE transceiver to transmit said ISDN connectivity reactivation message within said EOC channel.

11. For use with an integrated services digital network (ISDN) telecommunication system having a first U Basic Rate-One Transmission Extension (U-BR1TE) transceiver, through which ISDN communication signals conveyed over an extended distance digital communications link are interfaced with a local metallic two-wire path, to which an ISDN switch is coupled, and a second U-BR1TE transceiver, through which said ISDN communication signals conveyed over said extended distance digital communications link are interfaced with a remote metallic two-wire path, to which a customer premises interface serving digital communications equipment at a customer premises site is coupled, an arrangement for reactivating previously deactivated ISDN connectivity between said ISDN switch and said digital communications equipment at said customer premises site comprising:

a first communications control processor in one of said first and second U-BR1TE transceivers that is programmed to initiate transmission of an ISDN connectivity reactivation message within an extended operations channel (EOC) transported by said extended distance communications link; and a second communications control processor in another of first and second U-BR1TE transceivers, that is programmed to reestablish ISDN connectivity between said ISDN switch and said digital communications equipment at said customer premises site, in response to said another U-BR1TE transceiver receiving said ISDN connectivity reactivation message within said EOC channel.

12. An arrangement according to claim 11, wherein said second communications control processor is operative to cause said another U-BR1TE transceiver receiving said ISDN connectivity reactivation message to transmit a 10 kHz wake-up tone, that is effective to reactivate digital communications circuitry terminating said another U-BR1TE's associated (local/remote) loop.

13. An arrangement according to claim 12, wherein said a first communications control processor is operative to cause said one U-BR1TE transceiver to transmit said ISDN connectivity reactivation message within said EOC channel, in response to receipt of a 10 kHz tone from circuitry terminating said one U-BR1TE's associated (local/remote) loop.

* * * * *